3,677,723
COMPOSITE MATERIAL OF VANADIUM ALLOYS
AND IRON OR NICKEL ALLOYS
Hans-Ulrich Borgstedt, Karlsruhe-Waldstadt, Manfred Ruhle, Frankfurt am Main, and Peter Wincierz, Oberursel, Taunus, Germany, assignors to Metallgesellschaft Aktiengesellschaft, Frankfurt am Main, Germany
No Drawing. Filed Mar. 11, 1969, Ser. No. 806,317
Claims priority, application Germany, Mar. 16, 1968,
P 16 08 157.5
Int. Cl. B32b 15/00
U.S. Cl. 29—194                                       7 Claims

ABSTRACT OF THE DISCLOSURE

A composite material for cladding nuclear fuel elements is composed of vanadium alloy base material joined to a metallic outer material composed of iron or nickel and being resistant to corrosion by reactor coolants.

---

This invention relates to a corrosion-resisting composite material consisting of vanadium-base alloys and intended for use as a structural and cladding tube material in nuclear reactors. Specifically, this invention relates to a composite material which comprises a base material consisting of a vanadium-base alloy and coating material which has been selected in view of the coolant to be used in the nuclear reactor.

In the manufacture of two-ply tubes for cladding fuel elements, it is known to shrink a very thin steel tube on an inner tube, which consists, e.g., of zirconium alloys as a base material as disclosed in printed German application 1,146,832. Attempts have also been disclosed to make two-ply cladding tubes which have an outer shell of high-grade steel and an inner tube of vanadium. In this case, only an inadequate bond has been obtained.

It is also known to use vanadium alloys as a material for making fuel element cladding tubes and structural members in nuclear reactors as disclosed in U.S. Pats. 2,863,818 and 2,886,431.

Such alloys containing, e.g., 2.5 to 15% titanium, 0.5 to 10% columbium, balance vanadium, have a number of properties which enable the use of such alloys in fast breeders. Of these valuable properties, the following are of special interest:

(1) Vanadium has a small capture cross-section for fast neutrons.

(2) There is no embrittlement under an irradiation with neutrons at elevated temperatures.

(3) High creep strength at temperatures of 500 to 900° C.

(4) Good compatibility with oxidic nuclear fuels.

Whereas such cladding material of vanadium-base alloys has the above-mentioned desirable properties, its corrosion behavior is not yet satisfactory in all cases. Specifically, the corrosion resistance to the coolants which are usual in reactors, such as steam, carbon dioxide and liquid sodium, at operating temperatures of 600 to 800° C. is inadequate.

It is an object of this invention to improve the corrosion resistance of such composite materials consisting of vanadium-base alloys, for use in structural parts and fuel element cladding tubes, and to provide composite materials which consist of vanadium-base alloys and have an optimum corrosion resistance to the respective coolant, steam, carbon dioxide or sodium, which is employed.

In general, this and other objects of this invention are obtained by providing a composite material for structural parts and for cladding fuel elements composed of a base material having a high mechanical strength and an outer material which resists the corrosion by a reactor coolant.

The composite material of this invention is characterized in that the base material consists of vanadium-base alloys.

The vanadium-base alloys which can be used in the composite material according to this invention may consist of alloys of vanadium and at least one of the alloying elements titanium, columbium, zirconium, chromium, molybdenum, tantalum, tungsten, aluminium, cobalt, nickel, beryllium, silicon, iron, yttrium and rare earth elements. These elements may be alloyed to the vanadium in the following amounts: 0 to 50% titanium, 0 to 40% columbium, 0 to 10% zirconium, 0 to 20% chromium, 0 to 25% molybdenum, 0 to 20% tantalum, 0 to 20% tungsten, 0 to 15% aluminium, 0 to 10% nickel, 0 to 1% beryllium, 0 to 3% silicon, 0 to 10% iron, 0 to 1% yttrium or rare earth elements, balance vanadium and impurities which are due to the manufacturing process and preferably comprise not more than 0.2% oxygen, not more than 0.1% carbon and not more than 0.1% nitrogen, said three elements totalling not more than 0.3%.

Hence, suitable vanadium-base alloys are, e.g., vanadium alloys containing up to 25% titanium and up to 5% columbium, vanadium alloys containing up to 20% chromium or molybdenum, or vanadium alloys having a high columbium content, such as an alloy consisting of 25 to 40% columbium, 3 to 15% titanium, 15 to 25% molybdenum, up to 5% chromium, up to 3% silicon, balance vanadium and usual impurities which are due to the manufacturing process and preferably comprise not more than 0.2% oxygen, not more than 0.1% carbon and not more than 0.1% nitrogen.

Particularly suitable are vanadium alloys containing 1 to 20% titanium, 0 to 20% columbium, balance vanadium, e.g., an alloy containing 3% titanium, 15% columbium, balance vanadium containing 0.05 to 0.1% oxygen, up to 0.05% carbon and up to 0.05% nitrogen. Such alloys have an excellent creep strength.

The outer material of the composite material is selected in view of the intended purpose of the composite material. Specifically, the outer material to be applied is selected in view of the coolant which is used in the nuclear reactor. The carbon, nitrogen and oxygen values must be controlled in each case. Each of these elements must not be present in an amount exceeding 0.01%. If the metallic coating material contains any of said elements in excess of 0.01%, the element must be converted into an innocuous form. For the purposes of this invention, carbon, nitrogen and oxygen are said to be present in an innocuous form if these elements are present in compounds which are non-reactive with the vanadium alloy at elevated temperatures (working temperatures). For instance, carbon contained in the outer material in excess of 0.01% is converted into a non-reactive carbide by an addition of a tenfold amount of columbium or of a fivefold amount of titanium. A nitrogen content in excess of 0.01% is converted into a non-reactive nitride by the addition of a tenfold amount of columbium or of a fivefold amount of titanium. An oxygen content in excess of 0.01% is converted into an innocuous form by an addition of approximately the same amount of aluminum. Besides, the undesired grain growth in the coating layer is prevented by the use of dispersions which are so finely divided that they do not dissolve in the matrix at the working temperatures. This may be accomplished, e.g., in nickel alloys by the formation and incorporation of columbium carbide or aluminum oxide; in this case, deleterious amounts of carbon and oxygen are also combined. In accordance therewith, the composite material according to this invention consists of a vanadium-base alloy base material and a coating which resists the corrosion by the respective coolant and consists of pure iron, iron alloys and high-grade steels having preferably a cubicspace-centered crystal lattice at the operating temperature, or of nickel or alloys of nickel with chromium, molybdenum, aluminum, titanium, cobalt, iron, columbium and/or tantalum, or of alloys of zirconium with at least one of the alloying elements copper, chromium, vanadium, molybdenum.

The content of carbon, nitrogen and oxygen in all metallic outer materials according to this invention must not exceed 0.01% for each of said elements, or each of said elements as far as it is present in excess of 0.01% must be in an innocuous form.

The coating materials to be used according to this invention generally have only one or more of the above-mentioned properties which are desirable and required for a reactor material. On the other hand, they have a very high resistance to corrosion in at least one coolant for nuclear reactors, such as steam, carbon dioxide or sodium.

Liquid sodium is used as a coolant in fast breeders. Such molten sodium contains oxygen in small amounts, which are inevitable technologically, e.g., about 0.001% $Na_2O$. When used in sodium-cooled fast breeders, composite materials according to this invention, particularly structural parts and cladding tubes of a vanadium-base alloy, have coatings of pure iron. Alternatively, the outer coating may consist of iron alloys, preferably of iron alloys which at the operating temperatures of the reactor have cubic space-centered crystal lattices. Such iron alloys consist, e.g., of 12 to 25% chromium, about 0.1% carbon and about 0.5% titanium or about 1% columbium, balance iron. Finally, the metallic outer material of the composite material according to this invention, particularly in the form of structural parts and cladding tubes of a vanadium-base alloy, may consist of a coating of nickel or alloys of nickel containing at least one of the elements chromium, iron, molybdenum, cobalt in an amount of up to 30% each, and one or more of the elements titanium, aluminum, columbium, tantalum in an amount of up to 10% each, whereas the total of the elements of the two classes mentioned last hereinbefore must not exceed 50%. Suitable iron alloys consist, e.g., of 14 to 16% chromium, 14 to 16% nickel, 0.4% titanium, up to 0.1% carbon, balance iron, or 12 to 25% chromium, up to 0.1% carbon, 0.4% titanium, balance iron. Corrosion-resisting coatings on composite material according to the invention may alternatively consist of molybdenum and molybdenum alloys, which may contain usual grain size-reducing admixtures, such as titanium carbide or zirconium carbide.

In steam-cooled nuclear reactors, composite materials according to the invention may be used, e.g., in cladding tubes, which comprise a vanadium-base alloy base material and an outer coating of nickel alloys, e.g., alloys containing 21 to 23% chromium, 8 to 10% molybdenum, 0.4% titanium, 0 to 4% aluminum, 3 to 4% columbium, 0.1% carbon, balance nickel, or of high-grade steels. Suitable high-grade steels, particularly those which have a cubic space-centered crystal lattice at the operating temperatures, are composed of 12 to 25% chromium, up to 0.1% carbon, balance iron.

In gas-cool nuclear reactors using carbon dioxide as a coolant, composite materials according to this invention may be used which comprise a base material of a vanadium-base alloy and an outer coating of high-grade steel. Preferred coatings of high-grade steel have a crystal lattice which is cubic space-centered at the operating temperature and are composed, e.g., of 12 to 25% chromium, up to 0.1% carbon and about 0.5% titanium or about 1% columbium, balance iron. For the same purpose, the outer coating of the vanadium-base alloy composite material according to this invention may consist of zirconium alloys. Suitable zirconium alloys contain 0 to 4% of at least one of the elements copper, vanadium, molybdenum, tungsten, chromium, iron. Where such zirconium alloys are used, it is not required in all cases to convert carbon, nitrogen or oxygen contents in excess of 0.01% into an innocuous form. In such cases, commercial zirconium alloys containing 0.1% oxygen and 0.05% carbon may be used as such. The vanadium-base alloy composite material according to this invention may be made by conventional processes, which are known per se. These known processes include joint extrusion processes as well as processes in which a composite material is made by shrinking inner and outer tubes together. Processes known per se may also be used in the manufacture of other corrosion-resisting vanadium-base alloy structural parts according to this invention, e.g., joint extrusion processes or shrinking in the manufacture of rods and other sections, and roll cladding or explosion cladding processes in the manufacture of sheets, strip and sheet bars.

Certain known properties of the vanadium alloys must be taken into acount when the metallic outer material is being applied. For instance, the alloys used according to the invention for protection against corrosion must contain the elements oxygen, carbon and nitrogen only in small amounts of 0.01% each because particularly under the conditions of joint extrusion these elements together with the vanadium alloy form brittle interlayers, which may prevent a subsequent cold-forming of the composite material. If said impurities in the starting material cannot be avoided, suitable elements must be added to convert said impurities into compounds which cannot react with the vanadium under the existing conditions. For instance, the carbon contained in commercial iron or nickel alloys may be converted into the innocuous columbium carbides or titanium carbides by an addition of columbium or titanium in stoichiometric amounts.

In the working of vanadium alloys to form the composite material according to this invention, relatively high temperatures are used, e.g., temperatures about 1100° C. during extrusion and above 1000° C. for process-annealing. The corrosion resisting layers to be used according to this invention tend to undergo a coarsening of the grain under these conditions. Coarse-grained materials cannot be machined or can be machined only with difficulty. The undesired grain growth can be prevented by the use of finely divided, stable dispersions, which are not dissolved in the matrix at the temperatures which are employed. In nickel alloys, this result can be produced, e.g., by the use of columbium carbide or alumina. In these compounds, the undesired carbon and oxygen contents have also been converted into an innocuous form.

EXAMPLE 1

A cladding tube for reactor fuel elements is made as follows from the composite material according to the invention. A shell of soft iron is formed around a round pin-shaped core consisting of a vanadium alloy, which contains 3% titanium, 15% columbium, 0.05 to 0.1% oxygen, up to 0.05% carbon, up to 0.05% nitrogen, balance vanadium. This core is formed with a suitable axial bore.

The thickness of the soft iron layer is dimensioned so that this layer will not be completely removed by corrosion within the intended useful life of the finished part. The shell consists of Armco iron containing 0.1% aluminum and 0.5% manganese. This material contains 0.001% carbon after high vacuum remelting and less than 0.01% nitrogen only in innocuously small amounts. The oxygen contained in amounts of 0.1 to 0.2% in the Armco iron was converted by additions of aluminum and manganese into a form which is innocuous during the subsequent machining. The shell and core were degreased. The shell with the core contained therein was evacuated and the shell and core were airtightly welded together. This two-ply slug is extruded at a ratio of approximately 10:1 to form a tube. To avoid the use of excessive extrusion forces in shaping the vanadium alloy having a high strength at elevated temperatures, the slug was heated to at least 1100° C. for the extrusion. To avoid wide reaction zones between the shell material and the vanadium alloy, however, the temperature of the slug should not exceed 1350° C.

The resulting two-ply tube was descaled and subjected to a softening vacuum annealing treatment and was then subjected to known cold processing operations, such as pilger rolling or tube drawing. The cold work hardness was eliminated by annealing in a vacuum at temperatures above 1000° C. Owing to the finely divided aluminum oxide contained in the soft iron, there was no grain growth during these annealing processes or during the extrusion.

In this way, a cladding tube was made which consists of the composite material according to this invention and which combines the desirable properties of the vanadium alloy, namely, high creep rupture strength, high neutron economy, absence of high-temperature embrittlement due to neutron irradiation, and good compatibility with oxidic, carbidic and nitridic nuclear fuels, with the favorable behavior of pure iron in liquid sodium so that the tube can be used to great advantage as a cladding tube for nuclear fuel elements in sodium-cooled fast breeders. Molybdenum may be used instead of pure iron. Because the mechanical properties of molybdenum differ less than those of pure iron from those of the vanadium alloy, molydenum-coated tubes of vanadium alloys can be more easily made in some manufacturing stages. More particularly, a concentric arrangement and circular form of the two layers can be more easily ensured. Besides, the corrosion resistance of molybdenum in sodium at relatively low temperature is somewhat higher than that of iron.

The usual stainless steels, in which carbon and nitrogen have been rendered innocuous by an addition of titanium or columbium or tantalum, may also be used as an outer or coating material. Owing to their mechanical properties, they also facilitate the manufacture. Besides, they differ from pure iron in that they do not rust when stored in the air.

The improvement in corrosion resistance over an uncoated tube of vanadium alloys is illustrated by the following figures:

| Material | Loss due to corrosion in flowing sodium at 600° C. |
|---|---|
| VTi3Nb15, milligrams per sq. cm.-hr. | 120×10⁻⁵ |
| Pure iron, milligrams per sq. cm.-hr. | 3×10⁻⁵ |
| Molybdenum containing 1% titanium carbide and zirconium carbide, milligrams per sq. cm.-hr. | 15×10⁻⁵ |
| Stainless chromium steels and chromium-nickel steels | (¹) |

¹ Similar to pure iron.

EXAMPLE 2

Cladding tubes consisting of the composite material according to the invention and intended for use in steam-cooled breeders are made substantially as described in Example 1 but from a vanadium alloy containing 3% titanium, 1% silicon, 0.05 to 0.1% oxygen, up to 0.05% carbon and up to 0.05% nitrogen, balance vanadium. The Armco iron may be preferably replaced by a steel containing 14 to 16% chromium, 14 to 16% nickel, 0.08 to 0.10% carbon, up to 0.03% nitrogen, 0.4 to 0.6% titanium, 0.06% boron, balance iron.

A corrosion-resisting coating may consist of a nickel alloy having the following composition: 21 to 23% chromium, 8 to 10% molybdenum, 0.4% titanium, 0.4% aluminum, 3 to 4% columbium and tantalum, up to 0.1% carbon, balance nickel. Where alloys containing more than about 25% nickel are used, the processing temperature must not exceed 1200° C. because molten nickel-vanadium phases occur above that temperature. The improved resistance of the composite material according to the invention compared to vanadium alloy is apparent from the following table:

| Material | Steam temperature, ° C.: 565 | 620 | 705 |
|---|---|---|---|
| | Removal of material in microns in three years | | |
| 9% molybdenum, 22% chromium, 0.4% aluminum, 0.4% titanium, up to 0.1% carbon, 3% columbium, balance nickel | 2.5 | 2.5 | 23 |
| Stainless chromium-nickel steels | 2.5 | 25 | |
| Vanadium alloys | (¹) | (¹) | (¹) |

¹ Are decomposed within a few hours under these conditions.

EXAMPLE 3

The composite materials according to the invention can also be successfully used in nuclear reactors which are cooled with carbon dioxide gas.

In the manufacture of structural elements, a sheet metal element consisting of a vanadium alloy containing 3% titanium, 1% silicon, 0.08% oxygen, up to 0.05% nitrogen, up to 0.05% carbon, balance vanadium, is placed between two sheet metal elements consisting of a nickel alloy containing 21% chromium, 9% molybdenum, 18% iron, 0.5% tungsten, balance nickel. This stack is placed into an oxidation-preventing shell of stainless chromium-nickel steel. Beryllium oxide is suitably strewed between the oxidation-preventing shell and the sheet element of nickel alloy so that the shell can be more easily removed at a later time. The oxidation-preventing shell is air-tightly closed by welding and the resulting assembly is rolled down by at least 50% in a single pass at 1100° C. This causes the nickel alloy to weld to the vanadium alloy so that a satisfactory metallic bond results whereas the oxidation-preventing shell can easily be removed. The composite material can easily be cold-worked after a suitable process anneal and may be formed, e.g. into spacers for the fuel rods in carbon dioxide-cooled reactors.

The following table indicates how the outer material improves the corrosion resistance of the composite material according to the invention consisting of a vanadium alloy.

| Material | Weight increase in milligrams per square centimeter-hour | | |
|---|---|---|---|
| | 700° C. | 900° C. | 1,000° C. |
| Stainless austenitic chromium-nickel steels | | 2×10⁻³ | |
| 22% chromium, 9% molybdenum, 18% iron, 0.5% tungsten, balance nickel | | 0.4×10⁻³ | 1×10⁻³ |
| 20% chromium, 0.4% titanium, balance nickel | | 1×10⁻³ | |
| 3% titanium, 15% columbium, balance vanadium | ª 3.5×10⁻² | | |

ª After 2,000 hours. Thereafter the oxide layer spalled.

The composite materials according to the invention permit of combining the excellent resistance of the vanadium alloys to creep rupture and radiation with the favorable resistance of other materials to corrosion. The resistance to creep rupture is indicated by the following table:

| Material | β B/10,000 hr. (kg./sq. mm.) | |
|---|---|---|
| | 650° C. | 850° C. |
| 16.5% chromium, 13.5% nickel, 1.3% molybdenum, up to 0.1% carbon, up to 1% columbium, 0.7% vanadium, balance iron | 14.5 | |
| 17% chromium, 12% nickel, 2.5% molybdenum, up to 0.08% carbon, balance iron | 12.5 | 2 |
| 12% chromium, up to 0.1% carbon, balance iron | <8 | |
| 22% chromium, 9% molybdenum, 0.4% titanium, 0.4% aluminum, 3% columbium, up to 0.1% carbon, up to 5% iron, balance nickel | 30 | |
| 3% titanium, 1% silicon, balance vanadium | 35 | 4-5 |
| 3% titanium, 15% columbium, balance vanadium | 30 | 2-3 |
| 3% titanium, 15% chromium, balance vanadium | 42 | |

The resistance of various materials to radiation may be described as follows:

| Class of materials | Loss of ductility at 600–750° C. after neutron irradiation |
|---|---|
| Austenitic steels and nickel base alloys. | 50–95%. |
| Ferritic chromium steels | The embrittlement is less than with the austenitic steels but still appreciable. |
| Vanadium alloys | No appreciable loss of ductility. |

Having now described the means by which the objects of this invention are obtained.

We claim:

1. A corrosion resisting composite material for structural parts and cladding fuel elements comprising a vanadium alloy base material having high mechanical strength joined to a metallic outer material resistant to corrosion by reactor coolants, said vanadium alloy base material comprising 0.1 to 50% titanium, 0 to 40% columbium, 0 to 10% zirconium, 0 to 20% chromium, 0 to 25% molybdenum, 0 to 20% tantalum, 0 to 20% tungsten, 0 to 15% aluminum, 0 to 10% nickel, 0 to 1% beryllium, 0 to 3% silicon, 0 to 10% iron, 0 to 1% yttrium, rare earth elements and the balance vanadium and impurities which are due to the manufacturing process and comprise not more than 0.2% oxygen, not more than 0.1% carbon and not more than 0.1% nitrogen, said three elements totalling not more than 0.3%.

2. A material as in claim 1, said base material comprising 1 to 20% titanium, 0 to 20% columbium, and the balance vanadium and impurities which are due to the manufacturing process and preferably comprise not more than 0.2% oxygen, not more than 0.1% carbon and not more than 0.1% nitrogen, said three elements totalling not more than 0.3%.

3. A material as in claim 1, said metallic outer material including carbon, nitrogen and oxygen in amounts not exceeding 0.01% each, or in innocuous form for amounts in excess of 0.01%.

4. A material as in claim 1, said metallic outer material being selected from the group consisting of pure iron, iron alloy, high-grade steel preferably having a cubic space-centered crystal lattice at reactor operating temperature, nickel, nickel alloys containing at least one of chromium, iron, molybdenum, in an amount of 30% each, titanium, aluminum, columbium, tantalum, in an amount up to 10% each, the total of all not exceeding 50%, and zirconium alloys containing copper, vanadium, molybdenum, chromium, iron, and tungsten.

5. A material as in claim 1 for use with a liquid sodium coolant, said metallic outer material being selected from the group consisting of pure iron, iron alloys having a cubic space-centered crystal lattice at reactor operating temperature and containing aluminum and manganese, nickel, nickel alloys containing at least one of chromium, iron, molybdenum, cobalt, in an amount up to 30% each, titanium, aluminum, columbium, tantalum, in an amount up to 10% each, and the total of all not exceeding 50%.

6. A material as in claim 1 for use with a steam coolant, said metallic outer layer being selected from the group consisting of high-grade steel having a cubic space-centered crystal lattice at reactor operating temperature, nickel, nickel alloys containing chromium, iron, molybdenum, cobalt, in an amount up to 30% each, titanium, aluminum, columbium, tantalum, in an amount up to 10% each, and the total of all not exceeding 50%.

7. A material as in claim 1 for use with a carbon dioxide coolant, said metallic outer layer being selected from the group consisting of high-grade steel having a cubic space-centered crystal lattice at reactor operating temperature, and zirconium alloys containing 0 to 4.0% of at least one of copper, vanadium, molybdenum, chromium, iron and tungsten.

References Cited
UNITED STATES PATENTS

| | | | |
|---|---|---|---|
| 2,886,431 | 5/1959 | Smith et al. | 75—134 |
| 3,031,392 | 4/1962 | Ida et al. | 176—67 |
| 3,060,557 | 10/1962 | Rostoker et al. | 29—194 |
| 3,067,116 | 12/1962 | Kittel et al. | 176—67 |
| 3,212,988 | 10/1965 | Ringot | 176—67 |
| 3,243,350 | 3/1966 | Lustman et al. | 176—70 |
| 3,262,858 | 7/1966 | Gittus | 176—73 |
| 3,301,668 | 1/1967 | Cope | 75—128 |
| 3,359,176 | 12/1967 | Antill | 176—82 |
| 3,442,761 | 5/1969 | Feraday | 176—67 |

L. DEWAYNE RUTLEDGE, Primary Examiner

E. L. WEISE, Assistant Examiner

U.S. Cl. X.R.

29—196, 198; 75—134 V